(12) United States Patent
Fervel et al.

(10) Patent No.: US 8,567,715 B2
(45) Date of Patent: Oct. 29, 2013

(54) FLIGHT CONTROL SYSTEM FOR AN AIRCRAFT

(75) Inventors: Marc Fervel, Toulouse (FR); Arnaud Lecanu, Blagnac (FR); Antoine Maussion, Toulouse (FR); Laurent Andrieu, Aucamville (FR)

(73) Assignee: Airbus Operations S.A.S., Toulouse (FR)

( * ) Notice: Subject to any disclaimer, the term of this patent is extended or adjusted under 35 U.S.C. 154(b) by 262 days.

(21) Appl. No.: 12/984,064

(22) Filed: Jan. 4, 2011

(65) Prior Publication Data

US 2011/0174921 A1    Jul. 21, 2011

(30) Foreign Application Priority Data

Jan. 18, 2010  (FR) ..................................... 10 50302

(51) Int. Cl.
*B64C 13/24* (2006.01)
*B64C 9/00* (2006.01)

(52) U.S. Cl.
USPC .......................... 244/99.4; 244/99.2; 244/99.9

(58) Field of Classification Search
USPC .................................................. 244/75.1, 87
See application file for complete search history.

(56) References Cited

U.S. PATENT DOCUMENTS

| | | | | |
|---|---|---|---|---|
| 4,273,006 A | * | 6/1981 | Woodbury | 244/213 |
| 4,345,538 A | * | 8/1982 | Warner et al. | 244/215 |
| 4,598,890 A | * | 7/1986 | Herzog et al. | 244/230 |
| 5,088,661 A | * | 2/1992 | Whitener | 244/76 R |
| 5,320,491 A | * | 6/1994 | Coleman et al. | 244/213 |
| 6,860,452 B2 | * | 3/2005 | Bacon et al. | 244/194 |
| 7,004,428 B2 | * | 2/2006 | Tracy et al. | 244/35 R |
| 7,455,264 B2 | * | 11/2008 | Wakayama | 244/215 |
| 2005/0242234 A1 | * | 11/2005 | Mahmulyin | 244/75.1 |
| 2006/0043242 A1 | | 3/2006 | Benson | |
| 2011/0095128 A1 | * | 4/2011 | Schwarze et al. | 244/87 |

FOREIGN PATENT DOCUMENTS

| | | |
|---|---|---|
| EP | 1 785 346 A2 | 5/2007 |
| FR | 2 929 590 A1 | 10/2009 |

OTHER PUBLICATIONS

U.S. Appl. No. 13/255,778, filed Sep. 9, 2011, Fervel, et al.
U.S. Appl. No. 13/255,406, filed Sep. 8, 2011, Fervel, et al.
Preliminary Search Report issued Sep. 9, 2010, in French Patent Application No. 1050302 (with English translation of Category of Cited Documents).
J-C Mare, "Les innovations de l'Airbus A380", Fluides and Transmissions, XP 1200118, Sep. 2004, pp. 54-59.

* cited by examiner

*Primary Examiner* — Joseph W Sanderson
*Assistant Examiner* — Marc Burgess
(74) *Attorney, Agent, or Firm* — Oblon, Spivak, McClelland, Maier & Neustadt, L.L.P.

(57) ABSTRACT

The invention relates to a flight control system for an aircraft comprising control surfaces and actuators associated with the control surfaces to control flight functions, including roll, yaw, pitching, and aerodynamic braking of the aircraft. The actuators associated with the control surfaces that control at least one of the flight control functions are electromechanical actuators. A part of the control surfaces associated with the electromechanical actuators is divided, where each of the divided control surfaces is comprised of at least two independent surfaces.

19 Claims, 10 Drawing Sheets

FLIGHT CONTROL SYSTEM FOR AN AIRCRAFT

TECHNICAL FIELD

The present invention relates to the field of flight control for an aircraft and more specifically the primary flight controls.

STATE OF THE PRIOR ART

Modern aircraft have flight control systems in which mechanical actions on piloting components (control stick, rudder bar, etc.) and/or, information from the automatic pilot, are converted into analogue signals which are transmitted to actuators maneuvering control surfaces enabling the rotation of the aircraft to be controlled around its three axes.

Presently, the actuators the most widely used in aeronautics are hydraulic servo-controls "S/C". A hydraulic servo-control is an actuator connected to a hydraulic system of the airplane through pipes coming from the hydraulic rack of the airplane. It comprises a servo-valve which directs the hydraulic pressure, provided by the hydraulic pumps of the airplane, to move the rod of the actuator that is connected to a control surface, for example an aileron, an elevator, a rudder, or an air brake.

The hydraulic system of the airplane may comprise several hydraulic circuits comprising reservoirs, pumps, filters, high pressure and low pressure manifolds, etc., supplying a plurality of hydraulic actuators that are controlled by analogue electric signals.

The hydraulic circuit may be supplied either by a hydromechanical "EDP" (Engine Driven Pump) directly connected to the accessory box (reduction gearbox) made available on each of the motors, or by an "EMP" (Electric Motor Pump).

Electro hydraulic actuators of "EBHA" (Electrical Backup Hydraulic Actuator) and "EHA" (Electro-Hydrostatic Actuator) type have appeared on the latest generations of aircraft.

An EBHA is a hybrid actuator that uses electric and hydraulic power. It is a hydraulic servo-control to which has been added a local electric pump, which makes it possible to provide the hydraulic pressure to the actuator in the event of loss of the main hydraulic circuit. It is connected both to the hydraulic system and to the electric system of the aircraft. The main power source is provided by the hydraulic system. In the event of a defect in the hydraulic system, the local electric pump is switched by electric signals to supply and control the actuator.

An EHA electro-hydrostatic actuator is connected to the electrical network of the aircraft and is not connected to the hydraulic system. It locally produces its own hydraulic pressure by means of a reservoir and an autonomous electro-hydraulic pump, which generates the hydraulic power necessary to move the actuating rod.

The flight control architecture of current aircraft comprises several hydraulic circuits.

FIG. 11 illustrates the architecture used in an A320 type airplane, which comprises three hydraulic circuits 1601, 1602, 1603 supplied by two independent motors 1610, 1620 of the airplane, the architecture is called 3H. Each circuit comprises a reservoir for a hydraulic fluid, one or more pumps and hydraulic pipes connected to specific actuators (not represented). Two of the circuits 1602, 1601 are each pressurised by an EDP and the third circuit 1603 is pressurised by an EMP.

More specifically, power is taken from the first motor 1610 by a first hydromechanical EDP 1611, which ensures the pressurisation of the fluid of the first circuit 1601.

In the same way, power is taken from the second motor 1620 by a second hydromechanical EDP 1621, which ensures the pressurisation of the fluid of the second circuit 1602. The second circuit 1602 may also be supplied by an electromechanical EMP 1622, which ensures alternatively with the second hydromechanical pump EDP 1621, on the ground when the motor is stopped, the pressurisation of the fluid of the second circuit 1602, for opening the cargo door for example.

Furthermore, power is taken from the first motor 1610 and/or second motor 1620 by an electric generator which supplies, via an electric bar, an electromechanical pump EMP 1613 or 1623 that ensures the pressurisation of the fluid of the third circuit 1603. The third circuit may also be supplied by a back up wind generator RAT 1633.

The wings 1100, 1200 and the empennage comprising a horizontal plane 1300, 1400 and a vertical plane 1500 are also represented in this figure.

The primary flight control system is constituted of two ailerons 1111, 1211 and ten air brakes 1121 to 1225 on the wings, two elevators (or height controls) 1331, 1431 in the horizontal plane, and a rudder 1541 in the vertical plane (or fin).

The control surfaces are controlled by hydraulic actuators (not represented) connected to the different hydraulic circuits 1601, 1602, and 1603. In particular, each of the ailerons 1111, 1211, and elevators 1331, 1431 is controlled by two hydraulic actuators. The rudder 1541 is controlled by three hydraulic actuators. Each of the ten air brakes 1121-1225 is controlled by a single hydraulic actuator.

Another architecture (not represented) concerns an A380 type airplane, which comprises four motors, one EDP per motor and two hydraulic circuits i.e. two EDP per circuit, to which are added 2 EMP per circuit. Two electric circuits complete the power sources for the actuators. The architecture is called 2H2E.

An aircraft of this size necessitates a higher number of control surfaces. Thus, the A380 airplane comprises six ailerons, sixteen air brakes, four height controllers and two fins.

These types of airplane use hydraulic actuators of S/C, EHA, or EBHA type. These hydraulic actuators all comprise a powerful hydraulic jack and can easily move the smallest to the largest control surfaces of an airplane. Their operating principle, which is based on the sliding (push/pull) of a smooth piston in a chamber, makes them intrinsically insensitive to binding, in other words their probability of binding is well below $10^{-9}$ per hour of flight, i.e. extremely improbable in terms of air safety. This is of great importance, because the binding of certain surfaces in extension is considered, in terms of air safety, as catastrophic, in other words the probability of such an event must be below $10^{-9}$ per hour of flight. Which is always the case with the use of a hydraulic actuator.

However, the hydraulic generation components (pumps, reservoirs, manifolds, intake lines, pressurisation lines, connectors, etc.) have an important impact on the overall mass balance of the airplane.

In addition, the installation of hydraulic pipes on an airplane is a delicate and costly task due to the precise alignments of the joins that need to be respected, the lay out rules that need to be respected in relation to the other systems (protection), and the leak tightness verification tests that need to be carried out.

Moreover, the maintenance of a hydraulic system demanding the opening of the hydraulic circuit requires long operations, thus necessitating a prolonged immobilisation of the airplane, and costly on account of the need to isolate the open circuit, protect other systems against any contact with the fluid, re-pressurise and purge after the intervention and carry out tests to check leak tightness.

At present, completely hydraulic-free electromechanical actuators EMA, which only require an electrical source for their power supply, exist. An EMA may be of linear type comprising in particular ball or roller screws, or instead may be of rotary type comprising reduction gears and bearings.

Nevertheless, an EMA actuator can bind with a probability greater than $10^9$ per hour of flight. Which is why, until now, EMA actuators have only been installed on some air brakes of certain types of airplanes equipped with a large number of air brakes. For example, Boeing on its B787 has installed EMA actuators in the wings only for two pairs out of seven pairs of air brakes.

The object of the present invention is to propose a reliable, robust and simple flight control system, which overcomes the aforementioned drawbacks, in particular not necessitating resorting either to a complex installation or long, restrictive and costly maintenance operations.

DESCRIPTION OF THE INVENTION

The present invention is defined by a flight control system for an aircraft comprising control surfaces, and actuators associated with said control surfaces for controlling flight functions of roll, yaw, pitching and aerodynamic braking of the aircraft, all the actuators associated with the control surfaces controlling at least one of said flight functions being electromechanical actuators, a part of said control surfaces associated with the electromechanical actuators being divided control surfaces, each of said divided control surfaces being composed of at least two independent surfaces.

Said part of the divided control surfaces may comprise divided elevators, and/or divided rudders, and/or divided ailerons. Each divided elevator may be composed of two independent elevator surfaces. Each divided rudder may be composed of two independent rudder surfaces. Each divided aileron may be composed of two independent aileron surfaces.

In a variant, each of the divided elevators, and/or rudders, and/or ailerons may be composed of three independent surfaces.

Advantageously, each of the independent surfaces of a divided control surface is controlled by at least one electromechanical actuator.

In particular, each of the independent surfaces of a divided control surface may be controlled by at least two electromechanical actuators comprising at least two electromechanical actuators functioning simultaneously.

According to a particular embodiment of the invention, each of the independent surfaces of at least one group of the divided control surfaces is controlled by a single electromechanical actuator, at least one independent surface belonging to said group of divided control surfaces comprising balancing means.

Each control surface belonging to air brake control surfaces, controlling the aerodynamic braking function of the airplane, may be controlled by a single electromechanical actuator.

Advantageously, said electromechanical actuator is configured according to a non reversible transmission, the non reversibility of said electromechanical actuator being ensured by a device for transforming a rotational movement into a translation movement.

According to a variant, each control surface belonging to air brake control surfaces, controlling the aerodynamic braking function of the airplane, may be controlled by at least two electromechanical actuators.

Advantageously, all of the electromechanical actuators associated with the control surfaces controlling at least two of said flight functions are identical.

The invention also relates to an airplane provided with a flight control system according to any of the preceding characteristics.

DETAILED DESCRIPTION OF SPECIFIC EMBODIMENTS

The basic idea of the invention consists in using more and more EMA (Electro Mechanical Actuators) for the primary flight controls for an aircraft, thanks to a synergy between actuators grouped together into defined related zones of the aircraft and, if appropriate, thanks to a particular configuration of the flight control surfaces.

The primary flight control system of an aircraft comprises control surfaces and actuators associated with the control surfaces for controlling the flight functions of roll, yaw, pitching and aerodynamic braking.

According to the invention, all of the actuators associated with the control surfaces controlling at least one flight function among the flight functions of roll, yaw, pitching and aerodynamic braking are electromechanical actuators EMA.

Electromechanical actuators make it possible to have a more electric aircraft by eliminating at least one part of the hydraulic means relative to the actuators associated with the function in question. It will be noted that each flight function is ensured by a related zone of the aircraft, which makes it possible to eliminate at least one part of the hydraulic distribution in this zone while at the same time reducing the dimensioning of the part generating the hydraulic power. This makes it possible to reduce the weight of the aircraft, facilitate maintenance and reduce costs. If required, this makes it possible to have a single reference of electromechanical actuators for at least one flight function. In addition, electromechanical actuators are more reliable than electrohydrostatic actuators (EHA) and electrical backup hydraulic actuators (EBHA), because they comprise fewer mechanical parts and do not comprise any hydraulic part.

It will be noted that any possible combination of two, three or four flight functions may also be ensured by electromechanical actuators.

Figure 1:
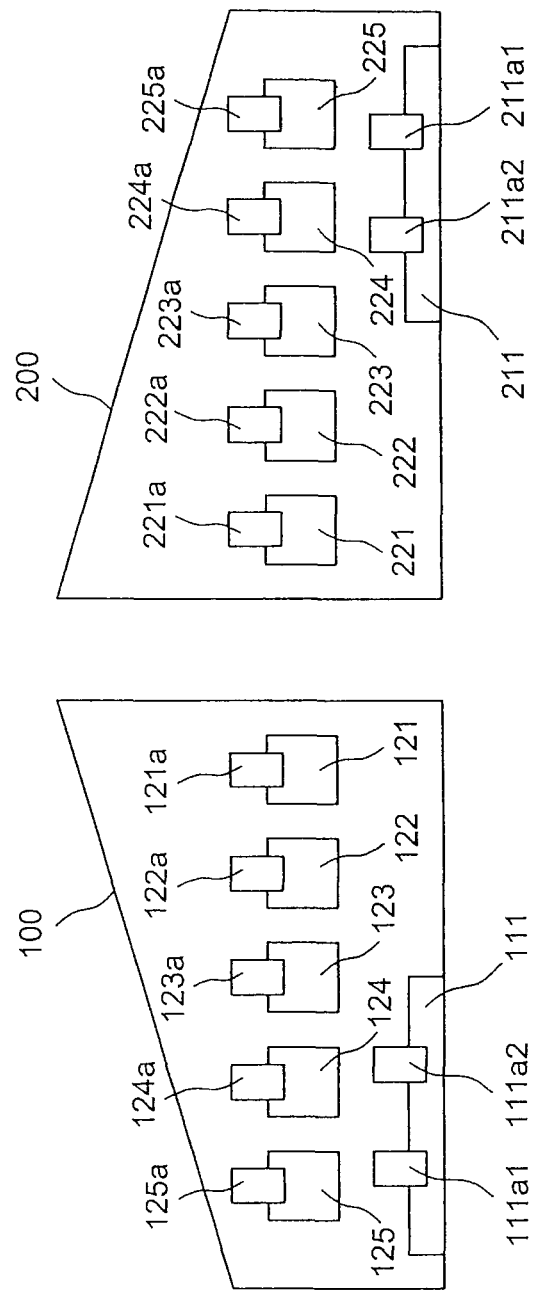
FIG. 1 represents a part of a primary flight control system, according to the invention.

FIG. 1 represents a part of the primary flight control system concerning, in particular, the flight functions of roll and aerodynamic braking according to one embodiment of the invention.

A port wing 100 and a starboard wing 200 are represented in this figure. The port wing 100 comprises a port aileron 111 and five port air brakes 121 to 125, and the starboard wing 200 comprises a starboard aileron 211 and five starboard air brakes 221 to 225. Each of the ailerons 111, 211 and/or air brakes 121-125, 221-225 is controlled by at least one electromechanical actuator 111a1, 111a2, 211a1, 211a2, and 121a to 225a.

It will be noted that the probability of binding of an EMA actuator is of the order of $10^{-7}$ or even $10^8$ per hour of flight and, consequently, the probability of a simultaneous binding of two independent actuators (in other words, on two independent control surfaces) is well below $10^{-9}$ per hour of flight and thus extremely improbable.

Furthermore, the consequence of the binding of an aileron remains acceptable for the safety of the airplane because the extension of the binding aileron may be compensated, while at the same time keeping the necessary authority on the roll axis, thanks to the other aileron still available and, if appropriate, the air brakes.

Furthermore, the consequence of binding of an air brake remains minor and may be easily compensated by the other air brakes still available.

Thus, the example of FIG. 1 shows that the aerodynamic braking function and/or roll flight function may be ensured by EMA actuators, enabling the hydraulic part at the centres and/or ends of the wings 100 and 200 to be eliminated. Advantageously, in the case where both functions are ensured by EMA actuators, it is then possible to eliminate the entire hydraulic part from the wings 100 and 200 of the airplane.

Since the electrical needs of airplanes are continually increasing, on-board electric generators are more and more numerous and powerful. In addition, the introduction of dissimilar electric generators makes it possible to envisage electricity as a reliable power source. Finally, the constraints imposed by the hydraulic circuits (weight, maintenance difficulties due to the presence of a fluid, etc.) prompt hydraulic circuits to be replaced by electric circuits.

Thus, it is very advantageous to generalise the use of EMA actuators to replace hydraulic actuators. Nevertheless, EMA actuators have a sensitivity to binding much higher than that of their hydraulic counterparts.

In order to resolve this problem of binding of EMA actuators, the present invention proposes dividing up at least one part of the control surfaces of the primary flight control system. More specifically, the invention proposes that at least one part of the control surfaces associated with the electromechanical actuators are divided control surfaces, each of the divided control surfaces being composed of at least two mechanically independent rapid surfaces.

The dividing up of the control surfaces makes it possible, in the event of binding of an actuator, to have sufficient functional rapid surfaces to both counter the stresses induced by the binding surface as well as to continue to control the airplane. In addition, given the reduced size of each independent surface, the binding of one of these surfaces generates less penalty of aerodynamic drag than the binding of a one-piece control surface. Moreover, the cutting up of the control surfaces into independent surfaces makes it possible to reduce the power of the actuators and thus to use actuators of small size that can be very easily integrated into the empennage and the aerofoil of the aircraft or the airplane.

The examples illustrated in FIGS. 2A to 3D show that the part of the divided control surfaces may comprise divided ailerons, and/or divided elevators and/or divided rudders.

Figure 2A:
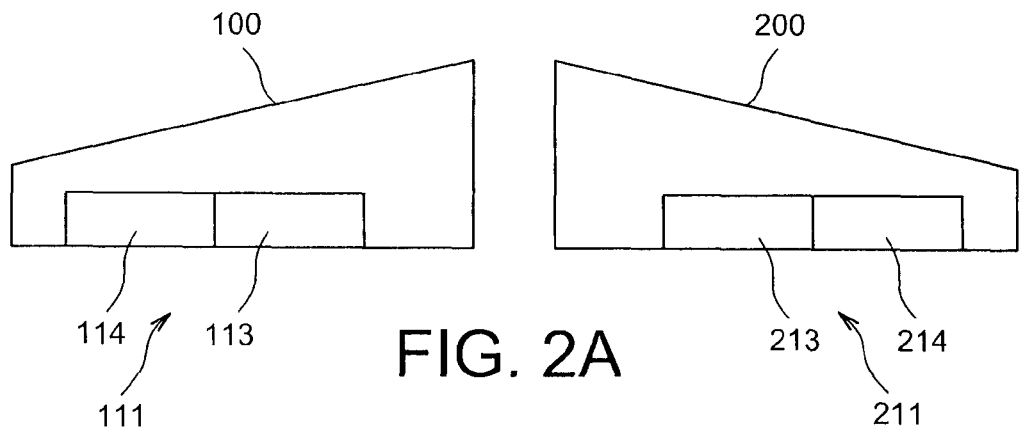
FIGS. 2A to 3D illustrate divided control surfaces, according to the invention.

The example of FIG. 2A shows that each aileron may be cut up into two independent surfaces. More specifically, this figure shows that the port aileron 111 is composed of two independent surfaces 113 and 114 and that the starboard aileron 211 is also composed of two independent surfaces 213 and 214.

Figure 2B:
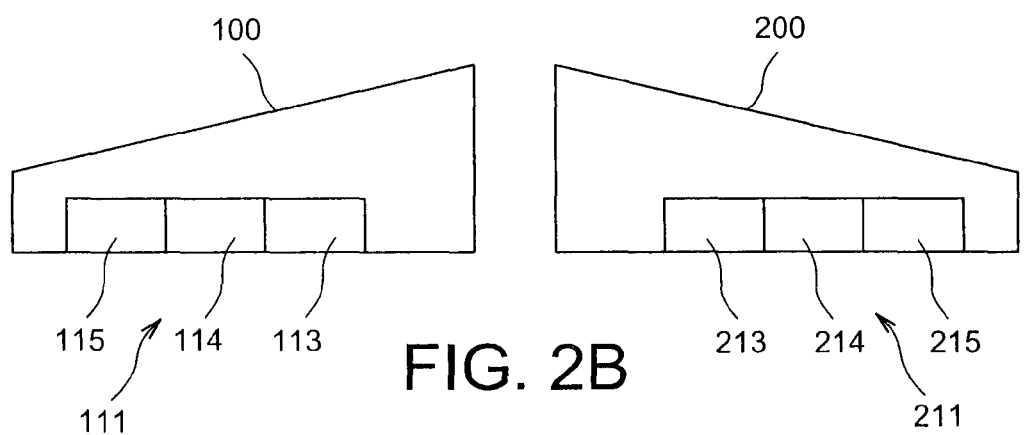

According to a variant, FIG. 2B shows that each of the port 111 and starboard 112 ailerons may be cut up into three independent surfaces (respectively 113 to 115 and 213 to 215).

Thus, by dividing up the ailerons 111, 211 into independent surfaces 113 to 215, the consequences of binding of one of these surfaces is reduced while at the same time eliminating the corresponding hydraulic part.

Figure 2C:
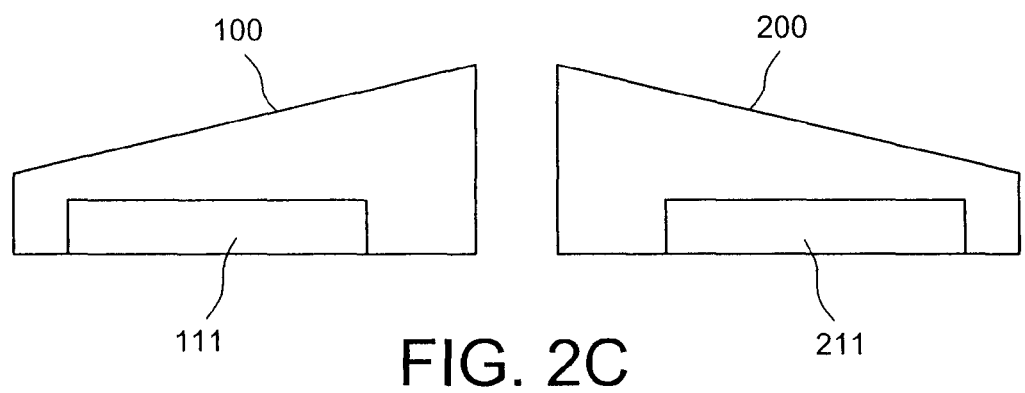

FIG. 2C shows nevertheless that each aileron 111, 211 may not be cut up and instead remain in one-piece form (as illustrated in the example of FIG. 1).

Figure 3A:
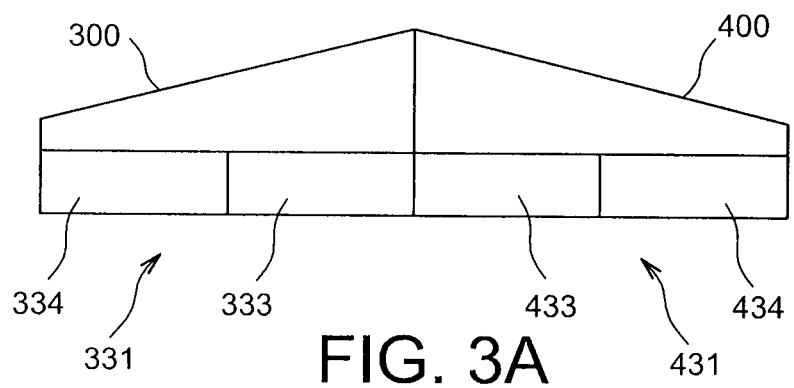

FIG. 3A shows that each elevator may be cut up into two independent surfaces. More specifically, this figure shows the port 300 and starboard 400 parts of the horizontal plane of the empennage comprising the port 331 and starboard 431 elevators. The port elevator 331 is composed of two independent elevator surfaces 333 and 334. Similarly, the starboard elevator 431 is composed of two independent elevator surfaces 433 and 434.

Figure 3B:
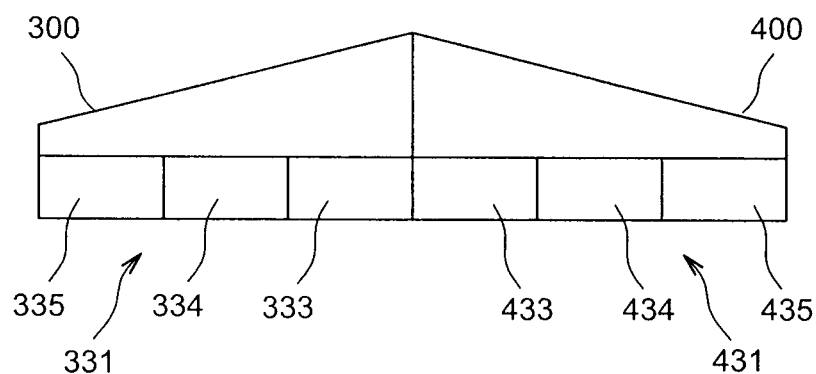

According to a variant, FIG. 3B shows that each of the elevators 331 and 431 may be cut up respectively into three independent surfaces 333 to 335 and 433 to 435.

The cutting up of the elevators 331, 431 makes it possible to use EMA actuators and, consequently, to eliminate the hydraulic part from the horizontal plane 300, 400 of the empennage.

Figure 3C:
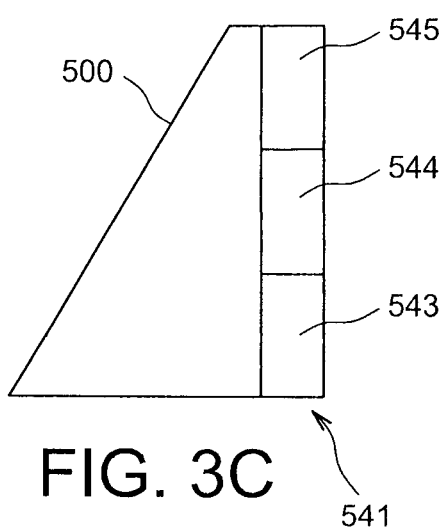

FIG. 3C illustrates the vertical plane 500 of the empennage comprising a rudder 541 composed of three independent rudder surfaces 543, 544, and 545. Advantageously, the rudder is cut up into three independent surfaces of equal efficiency and each independent surface may be actuated by one, two or even more actuators.

Thus, the binding of one independent surface (for example, 543) brings about a yaw movement of the airplane. However, the second surface (for example, 545), which is of the same efficiency on this same axis, makes it possible to counter this yaw movement by controlling its position in the opposite direction. Moreover, the third surface 544 makes it possible to conserve a minimum of yaw control.

Figure 3D:
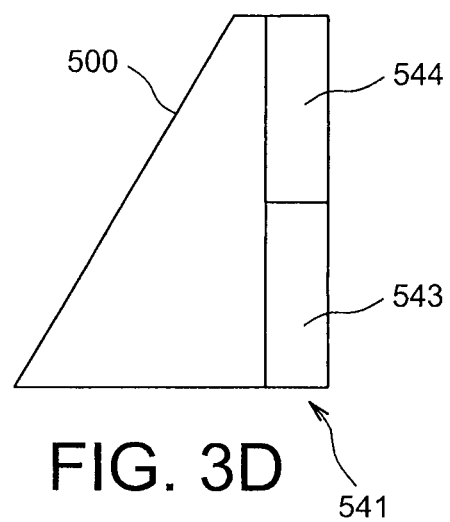

FIG. 3D illustrates a variant of FIG. 3C, where the rudder 541 is composed of two independent rudder surfaces 543 and 544. This type of cutting up may be adapted to a single engine type airplane.

The cutting up of the rudders 541 makes it possible to use EMA actuators and, consequently, to eliminate the hydraulic part from the vertical plane 500 of the empennage. Advantageously, when the elevators 331, 431 and rudders 541 are cut up, the hydraulic part of the whole empennage may be eliminated.

It will be noted that each of the independent surfaces may be actuated by one, two or even more EMA actuators, which may be distributed in several ways.

Generally speaking, each of the one-piece control surfaces or independent surfaces of a divided control surface is controlled by at least one EMA actuator.

More specifically, each of the one-piece control surfaces or independent surfaces may be controlled by at least two EMA actuators, which may advantageously comprise at least two EMA actuators functioning simultaneously. This makes it possible to reduce the bulk of the actuators and thus to facilitate their integration in the structure of the aircraft.

FIGS. 4A-4D illustrate different embodiments of distribution and dimensioning of the actuators in the case where two EMA actuators are used per control surface or independent surface.

Figure 4A:
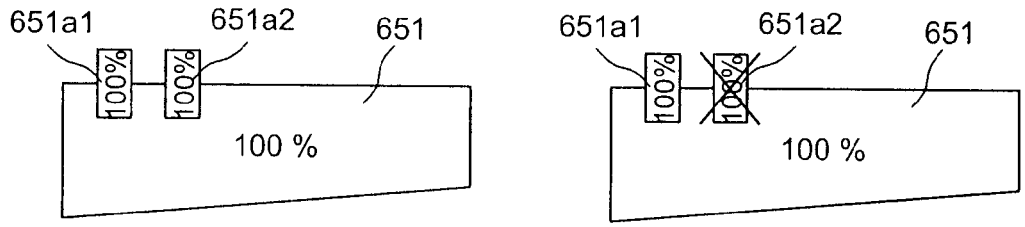
FIGS. 4A-4D illustrate different embodiments of distribution and dimensioning of EMA actuators, according to the invention.

FIG. 4A is a first embodiment illustrating two EMA actuators 651a1 and 651a2 directing a one-piece control surface 651, each of the two EMA actuators 651a1 and 651a2 being able to ensure alone full performance. An actuator failure thus has no immediate effect on the performance of the airplane.

According to this first embodiment, the nominal available power is 200% compared to the required power which is 100%. Consequently, the available power following a failure of an actuator 651a2 is 100%. In this case, the weight of the actuators compared to the power required is 200% and consequently, the efficiency of the architecture corresponding to this embodiment is 50%. The efficiency of the architecture is defined as being the ratio between the "available power in the event of failure of an actuator" and the "weight of the actuators compared to the required power".

Figure 4B:
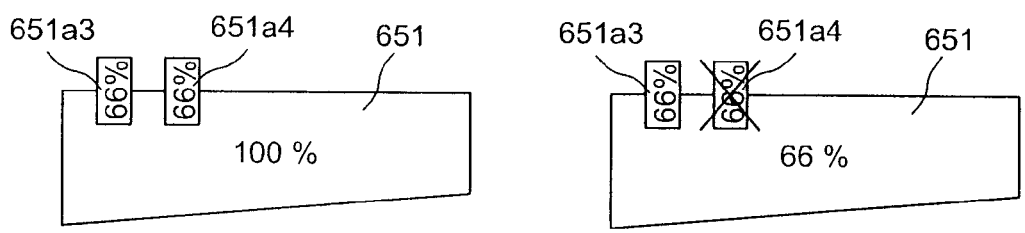

FIG. 4B is a second embodiment consisting in using two EMA actuators of smaller size functioning simultaneously in order to offer full performance in nominal mode and under degraded performance in the event of loss of an actuator.

It will be noted that the power of an actuator necessary for the movement of a given surface is, to the first order, proportional to the volume of this surface. Similarly, the weight of the actuator is proportional to the power of this actuator. Thus, a simultaneous dividing up of two EMA actuators on a same surface makes it possible to add together their powers and thus to optimise their dimensioning and to further reduce their sizes.

Indeed, FIG. 4B illustrates two EMA actuators 651a3 and 651a4 directing simultaneously a one-piece control surface 651, and each of the two EMA actuators 651a3 and 651a4 ensuring a power of 66%. According to this second embodiment, the nominal available power is 133% compared to the required power and, consequently, the available power in the event of a failure of an actuator 651a4 is 66%. In this case, the weight of the actuators compared to the required power is 133% and, consequently, the efficiency of the architecture corresponding to this embodiment is 50%.

Figure 4C:
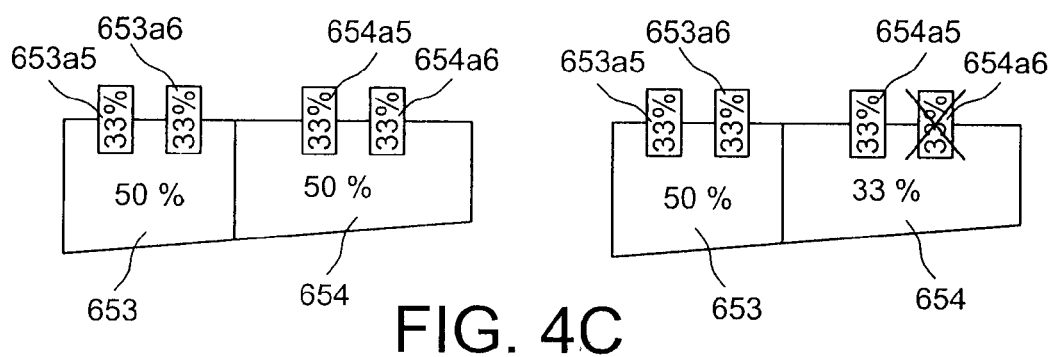

FIG. 4C is a third embodiment which combines the advantage of simultaneous functioning of the EMA actuators with that of dividing up the control surfaces.

Indeed, the dividing up of the control surfaces induces fewer losses of aerodynamic efficiency when an actuator fails, since the majority of the rapid surfaces remain 100% available. This makes it possible to optimise even further the power of the actuators by proposing an active-active mode for all of the fragments.

More specifically, FIG. 4C illustrates a control surface 651 cut up into two independent surfaces 653 and 654. A first independent surface 653 is directed by two EMA actuators 653a5 and 653a6 functioning simultaneously and a second independent surface 654 is directed by two EMA actuators 654a5 and 654a6 functioning simultaneously. Each of the EMA actuators 653a5-654a6 ensures a power of 33%.

According to this third embodiment, the nominal available power is 66% on each independent surface 653 and 654 compared to the required power which is 50%. Consequently, the available power on the totality of the surfaces in the event of failure of an actuator 654a6 is 83%. In this case, the weight of the actuators compared to the required power is 133% and, consequently, the efficiency of the architecture corresponding to this embodiment is 62%.

Figure 4D:
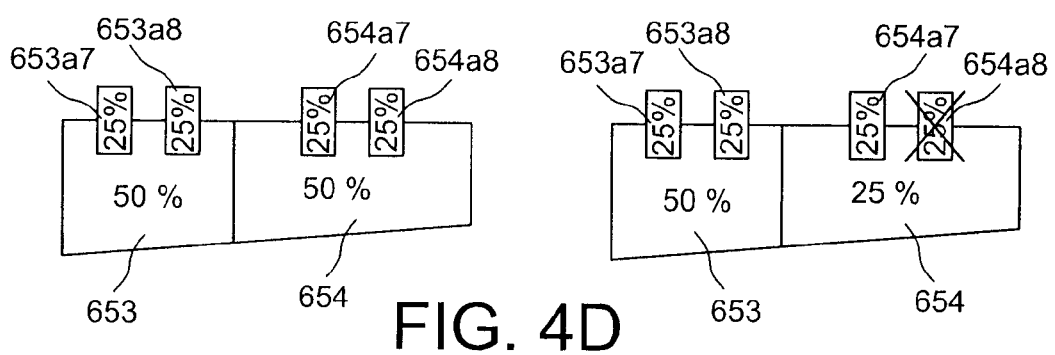

Finally, FIG. 4D is a variant of FIG. 4C illustrating two independent surfaces 653 and 654. Each of the independent surfaces 653 and 654 is directed simultaneously by two EMA actuators 653a7, 653a8 and 654a7, 654a8, each of the EMA actuators 653a7 to 654a8 ensuring a power of 25%. According to this fourth embodiment, the nominal available power is 50% on each surface compared to the required power which is also 50% and, consequently, the available power on the totality of the surfaces in the event of failure of an actuator is 75%. In this case, the weight of the actuators compared to the required power is 100% and, consequently, the efficiency of the architecture corresponding to this embodiment is 75%.

These different embodiments make it possible to compare and thus to optimise the dimensioning of the EMA actuators. Obviously, it will be noted that for these embodiments it is not indispensable to have available 100% of the required power for the manoeuvre of the control surface. The fact of having available less than 100% power does not prevent the manoeuvre of the control surface, but simply reduces the dynamic of it.

Furthermore, only a single EMA actuator may be used per control surface or rapid surface. This second solution has the advantage of substantially reducing the number of actuators per airplane.

However, in this instance, it is advantageous to ensure that these surfaces are not subject to flutter in the event of rupture of the tie of the actuator.

In this case, the surface may be balanced, for example by bringing its centre of gravity onto the hinge in order to make its oscillations convergent. A normal solution consists in using an extended cord, such as for example on the ailerons, height controls and rudders of the ATR range.

For example, in the case where each of the independent surfaces of at least one group of divided control surfaces is controlled by a single electromechanical actuator, it may be provided so that at least one independent surface belonging to the group of divided control surfaces comprises balancing means.

In general, it is above all the rapid surface the furthest from the fuselage of the airplane that may necessitate the most balancing. Thus, the balancing means may be advantageously fitted on each independent surface belonging to the group of divided control surfaces which is situated at a furthest end in relation to the fuselage of the airplane.

FIGS. 5A to 8B illustrate different embodiments showing different examples of distributions of EMA on different divided or non divided control surfaces of the primary flight control.

Figure 5A:
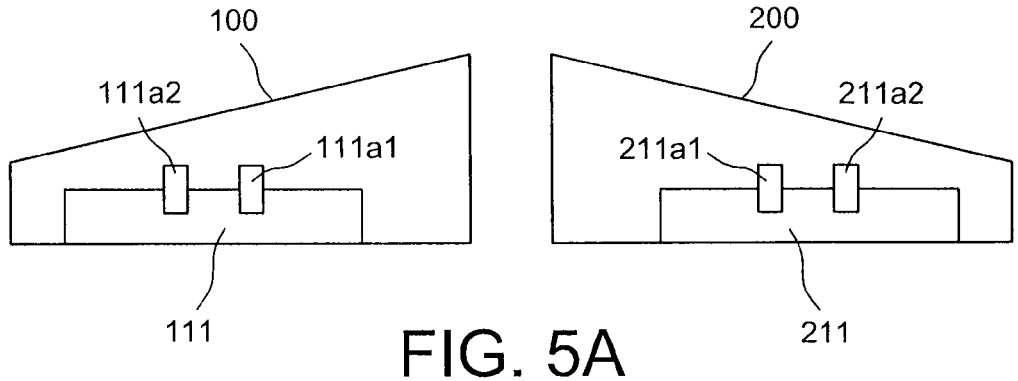
FIGS. 5A to 8B illustrate different embodiments of dividing up and distribution of EMA actuators, according to the invention.

FIG. 5A illustrates a one-piece port aileron 111 actuated by two EMA actuators 111a1 and 111a2 functioning concurrently and a one-piece starboard aileron 211 actuated by two EMA actuators 211a1 and 211a2 functioning concurrently.

Figure 5B:
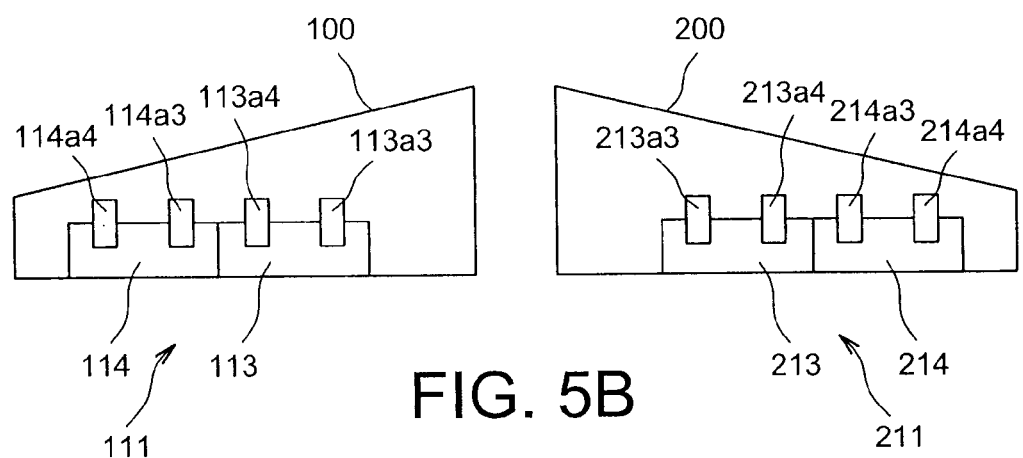

FIG. 5B illustrates a port aileron 111 composed of two independent surfaces 113 and 114 and a starboard aileron 211 composed of two independent surfaces 213 and 214. Each of the independent surfaces 113, 114, 213, and 214 is respectively actuated by two EMA actuators 113a3-113a4, 114a3-114a4, 213a3-213a4, and 214a3-214a4 preferably, functioning in active-active mode. Thus, according to this configuration, eight EMA actuators are used for four independent aileron surfaces.

Figure 5C:
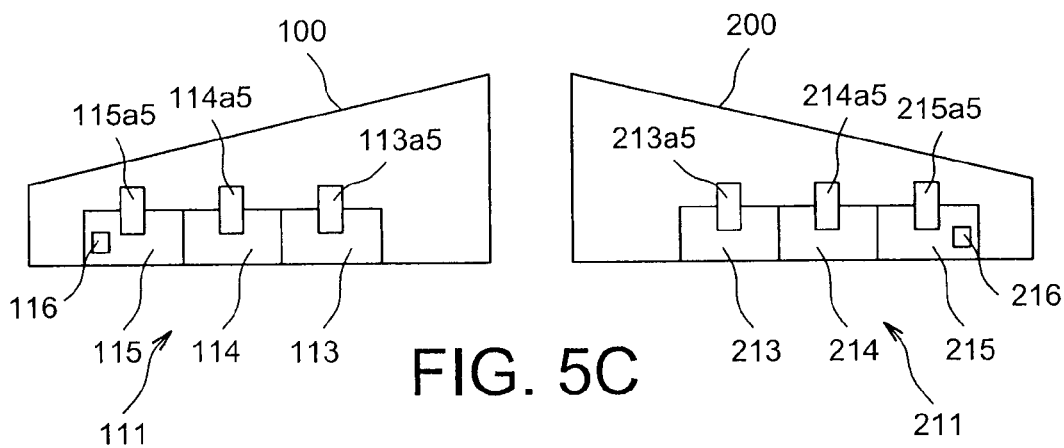

FIG. 5C illustrates a port aileron 111 composed of three independent surfaces 113, 114 and 115 and a starboard aileron 211 composed of three independent surfaces 213, 214 and 215. Each of the independent surfaces 113 to 215 is respectively actuated by a single EMA actuator 113a5 to 215a5. Depending on the case, the furthest independent surfaces 115 and 215 each comprise balancing means 116 and 216 respectively. Thus, according to this configuration, six EMA actuators are used for six independent aileron surfaces and two balancing means 116 and 216 for the two exterior surfaces 115 and 215.

Figure 6A:
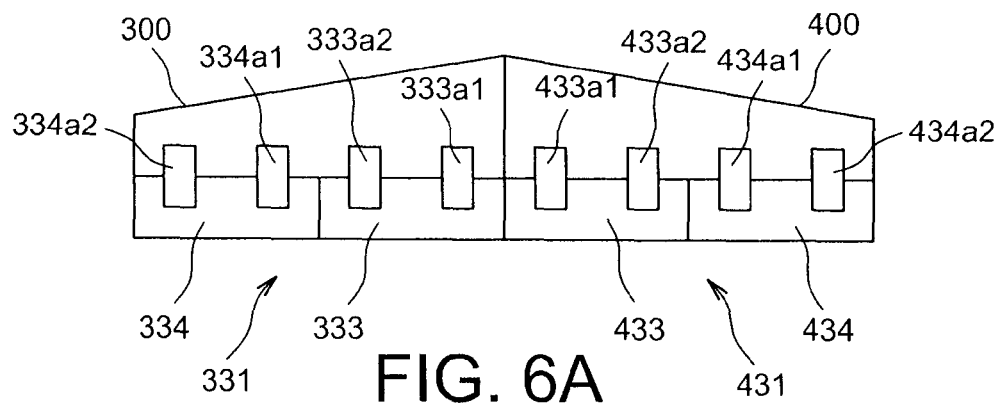

FIG. 6A illustrates a port elevator 331 divided into two independent surfaces 333 and 334, and a starboard elevator 431 divided into two independent surfaces 433 and 434. Each of the independent surfaces 333 to 434 is respectively actuated by two EMA actuators 333a1-333a2, 334a1-334a2, 433a1-433a2 and 434a1-434a2 preferably functioning in active-active mode. Thus, according to this configuration, eight EMA actuators are used for four independent elevator surfaces.

Figure 6B:
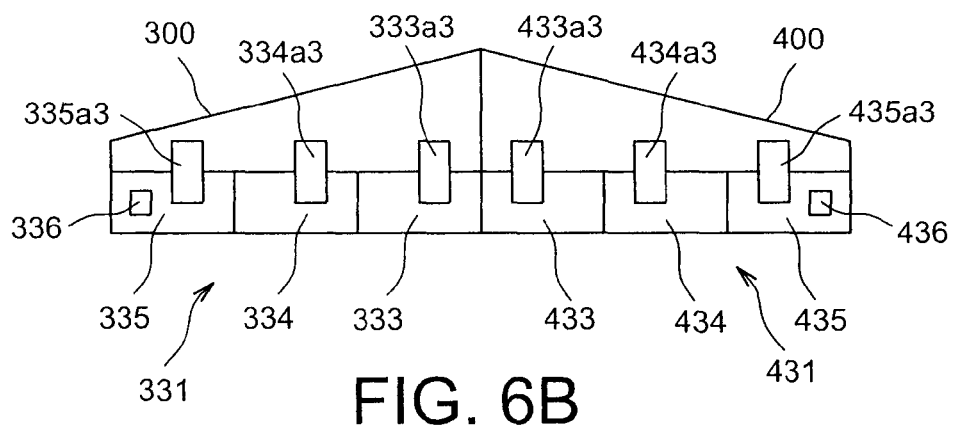

FIG. 6B illustrates a port elevator 331 divided into three independent surfaces 333, 334, and 335 and a starboard elevator 431 divided into three independent surfaces 433, 434, and 435. Each independent surface 333 to 435 is respectively actuated by a single EMA actuator 333a3 to 435a3. Depending on the case, the furthest independent surfaces 335 and 435 each comprise balancing means 336 and 436 respectively. Thus, according to this configuration, six EMA actuators are used for six independent elevator surfaces and two balancing means 336 and 436 for the two exterior surfaces 335 and 435.

Figures 7A, 7B:
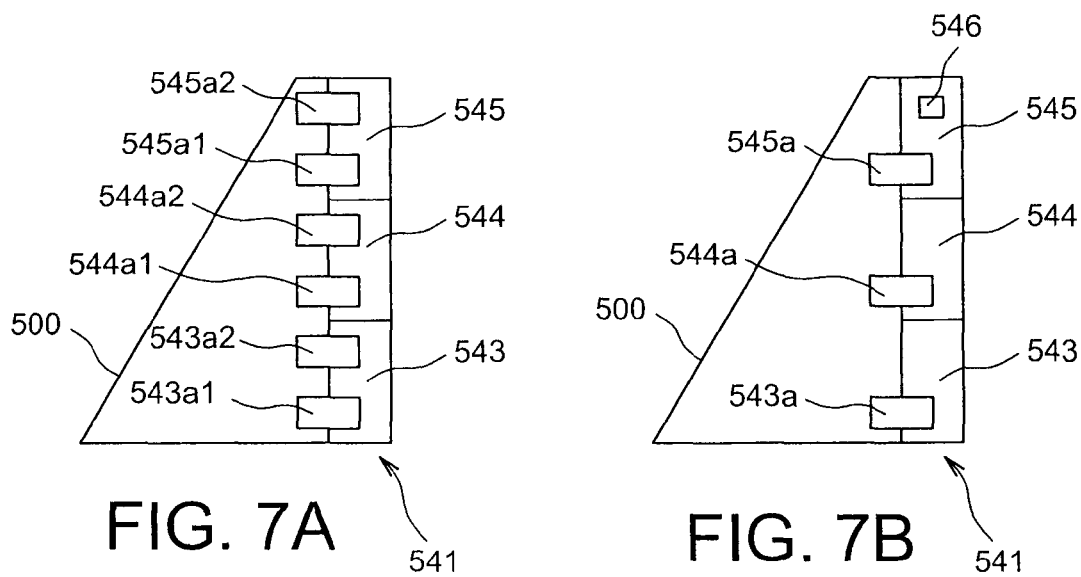

FIG. 7A illustrates a rudder 541 divided into three independent surfaces 543, 544, and 545. Each of the independent surfaces 543 to 545 is respectively actuated by two EMA actuators 543a1-543a2, 544a1-544a2, and 545a1-545a2 preferably functioning in active-active mode. Thus, according to this configuration, six EMA actuators are used for three independent surfaces de direction.

FIG. 7B is a variant of FIG. 7A showing that each of the three independent surfaces 543 to 545 is actuated by a single EMA actuator 543a, 544a, and 545a, and that the independent surface the furthest 545 from the fuselage comprises balancing means 546. Thus, according to this configuration, three EMA actuators are used for three independent rudder surfaces and it suffices to use balancing means 546 uniquely for the independent upper surface 545.

It will be noted that the configurations of FIGS. 7A and 7B may also be used for a rudder divided into two independent surfaces, as illustrated in FIG. 3D.

Figure 8A:
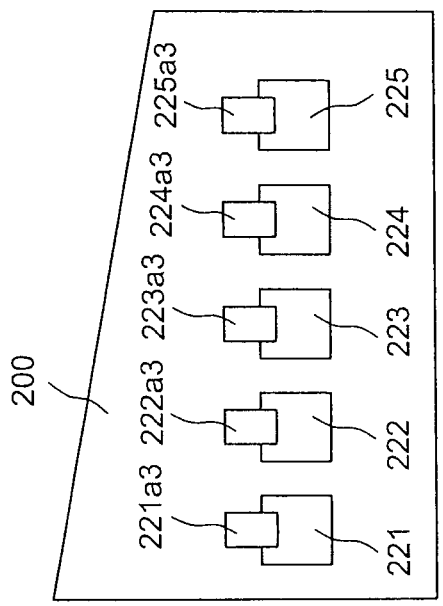

FIG. 8A illustrates port air brakes and starboard air brakes. This figure shows, by way of example, five air brakes 121 to 125 and 221 to 225 respectively on each of the wings 100 and 200. Each of the air brakes 121 to 225 is actuated by a single EMA actuator 121a3 to 225a3. If required, each air brake may be divided into two independent surfaces. Thus, it is possible, for example, to use ten EMA actuators for ten independent air brake surfaces per wing.

It will be noted that the air brakes are rapid surfaces that must remain pinned down in the event of power loss of the actuator. The classical solution consists in using a power off brake or a ratchet wheel system.

The present invention proposes using an EMA actuator configured according to a non reversible transmission. The non-reversibility of the EMA actuator may be ensured by a device for transforming a rotational movement into a translation movement. This transformation device may comprise a non reversible ball screw or a roller screw or even a simple screw. The irreversibility of the device has the advantage of making it possible to eliminate the power loss brake and the ratchet wheel of the prior art.

Thus, in the case of power loss, the non reversible EMA actuator can maintain the air brakes pinned down. This makes it possible to reduce the costs of the transformation device while at the same time eliminating the power off brakes or any other anti-extension function.

Figure 8B:
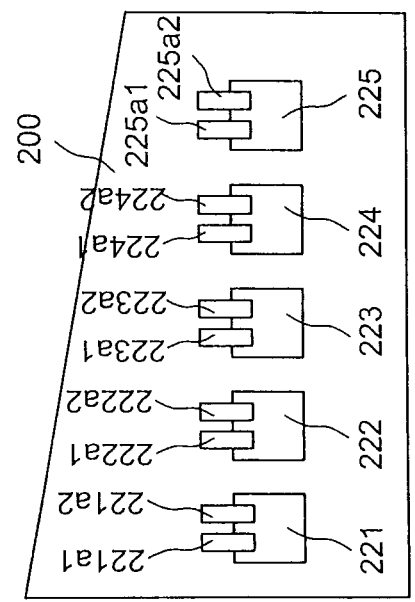

FIG. 8B is a variant of FIG. 8A showing that each air brake 121 to 225 is respectively actuated concurrently by two EMA actuators 121a1-121a2 to 225a1-225a2. For example, between eight and twenty air brakes may be used per wing, and consequently between sixteen and forty EMA actuators per wing.

It will be noted that in all of the examples of FIGS. 5A-7B and 8B, the EMA actuators are reversible actuators. More specifically, in the embodiments using at least two EMA actuators per one-piece control surface or independent surface, the reversible actuators allow the movements of the control surface or the independent surface if one of the actuators has failed (except for binding). Advantageously, the different actuators associated with a control surface are powered by at least two dissimilar and segregated energy sources, in such a way that the probability of power loss of all of the actuators associated with said control surface is less than $10^{-9}$ per hour of flight. In the case of the example of FIG. 8B, this has the advantage of making it possible to eliminate the energy loss brake and the ratchet wheel of the prior art.

Obviously, all of the combinations of configurations illustrated in FIGS. 5A-8B may be envisaged. Advantageously, the configurations may be combined so that all of the electromechanical actuators associated with the control surfaces controlling at least two of the flight functions are identical. This makes it possible to fit the same electromechanical actuators on all of the surfaces necessitating power levels of same order of magnitude.

More specifically, the combination of the configurations illustrated in FIGS. 5B, 6A, 7A and 8B (respectively, in FIGS. 5C, 6B, 7B and 8A) makes it possible to fit the same EMA actuator on all of the rapid surfaces of the ailerons 111, 211, elevators 331, 431 and rudder 541, as well as the air brakes 121 to 225. This standardisation of actuators makes it possible to increase production volumes, facilitate development and maintenance, and consequently lower costs.

In addition, the present invention makes it possible to go to a completely electric primary flight control system by using EMA actuators on the air brakes 121 to 225 and ailerons 111, 211 (divided or not divided) and on the divided elevators 331, 431 and rudder 541.

Figure 9:
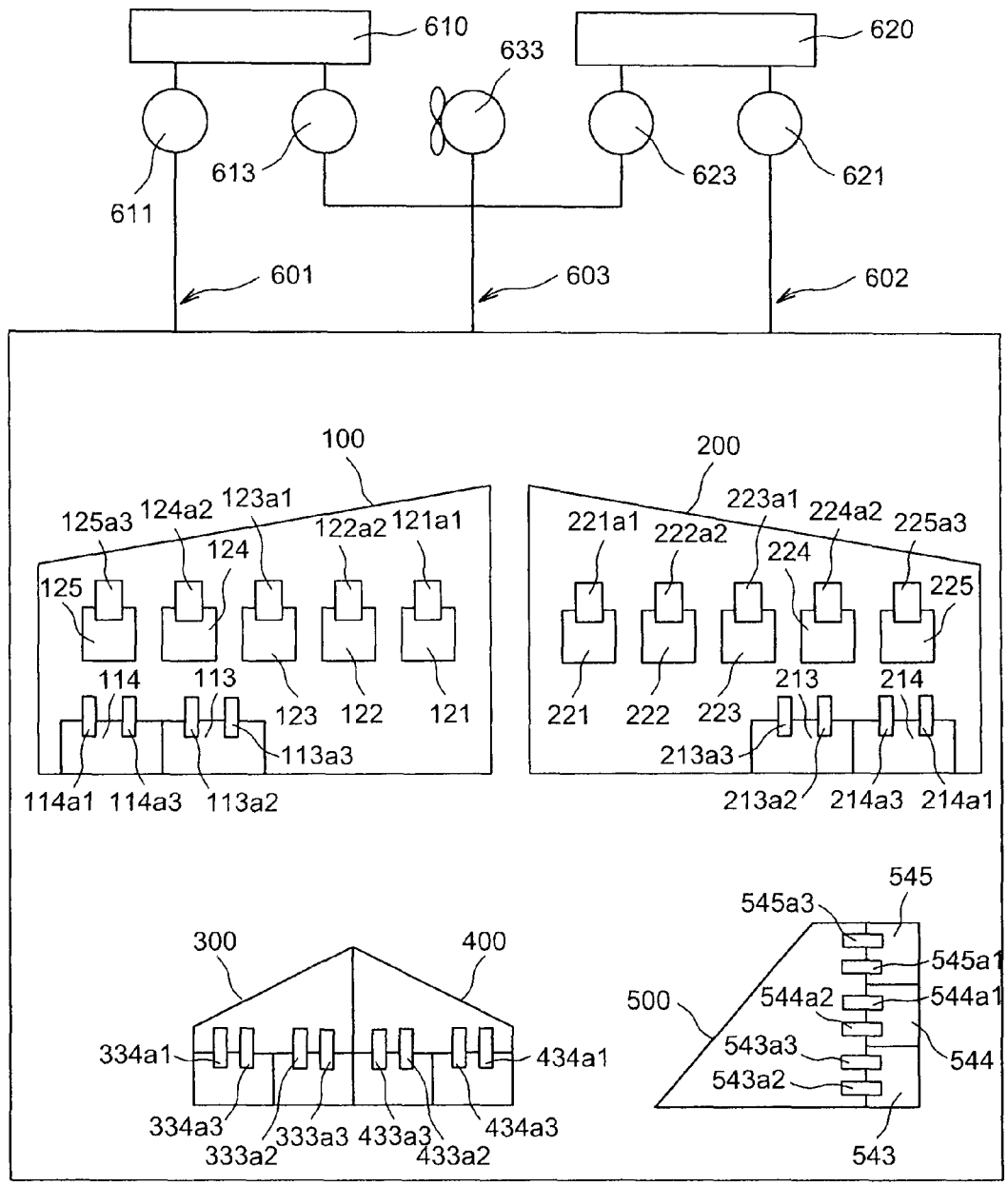
FIG. 9 illustrates an embodiment of the flight control architecture in a conventional airplane of medium range type, according to the invention.

FIG. 9 illustrates an embodiment of the flight control architecture according to the invention which may be used for example, in a conventional medium range type airplane. This architecture comprises three electric circuits 601, 602 and 603 supplied by two independent motors 610 and 620 of the airplane.

The first and second motors 610 and 620 drive respectively first and second VFG (Variable Frequency Generator) generators 611 and 621 and first and second PMG (Permanent Magnet Generator) generators 613 and 623.

The first and second generators VFG 611 and 621 deliver variable frequency currents respectively to the first and second electric circuits 601 and 602.

The first and second generators PMG 613 and 623 deliver constant frequency currents to the third electric circuit 603.

The generators PMG 613 and 623 may be used conjointly to supply the third circuit 603. As a variant, the third circuit 603 may be powered indifferently by either of the generators PMG 613 and 623.

Advantageously, a back up electric wind generator RAT 633 may be used to supply the third circuit 603.

The primary flight control on the wings 100, 200 and the empennage 300, 400 and 500 of the airplane are also represented in this figure.

According to this particular embodiment, the primary flight control comprises two independent surfaces 113, 114 of port aileron 111, two independent surfaces 213, 214 of starboard aileron 211, two independent surfaces 333, 334 of port elevator 331, two independent surfaces 433, 434 of starboard elevator 431, and three independent surfaces 543, 544, 545 of rudder 541.

The primary flight control also comprises five port air brakes 121 to 125 and five starboard air brakes 221 to 225.

Advantageously, each of the three electric circuits 601, 602, 603 may be used to ensure on its own the control of the piloting of the airplane under all these axes.

For example, each independent aileron surface may be controlled by two actuators connected respectively to the first and third electric circuits 601, 603 or to the second and third electric circuits 602, 603. The ten air brakes 121 to 225 may be controlled respectively by ten actuators, four actuators being connected to the first electric circuit 601, four other actuators being connected to the second electric circuit 602, and the final two actuators being connected to the third electric circuit 603. Each of the two first independent elevator surfaces may be controlled by two actuators connected respectively to the first and third electric circuits 601, 603 and each of two second independent elevator surfaces may be controlled by two actuators connected respectively to the second and third electric circuits 602, 603. Finally, each independent rudder surface may be controlled by two actuators connected respectively to two electric circuits among three different combinations of electric circuits.

More specifically, the first electric circuit 601 is used to control one of the two EMA actuators associated respectively with independent exterior surfaces 114, 214 of the port and starboard ailerons (in other words, the actuators 114a1 and 214a1), the independent exterior surfaces 334, 434 of the port and starboard elevators (in other words, the actuators 334a1 and 434a1), and the independent intermediate 544 and upper 545 rudder surfaces (in other words, the actuators 544a1 and 545a1). The first electric circuit 601 is also used to control the actuators associated respectively with two port air brakes 121a1, 123a1 and two starboard air brakes 221a1, 223a1.

The second electric circuit 602 is used to control one of the two EMA actuators associated respectively with the independent interior surfaces 113, 213 of the port and starboard ailerons (in other words, the actuators 113a2 and 213a2), the independent interior surfaces 333, 433 of the port and starboard elevators (in other words, the actuators 333a2, 433a2), and the independent lower 543 and intermediate 544 rudder surfaces (in other words, the actuators 543a2 and 544a2). The second electric circuit 602 is also used to control the actuators 122a2, 124a2, 222a2, and 224a2 associated respectively with two port air brakes 122, 124 and two starboard air brakes 222, 224.

The third electric circuit 603 is used to control one of the two EMA actuators associated respectively with the independent interior 113, 213 and exterior 114, 214 surfaces of the port and starboard ailerons (in other words, the actuators 113a3, 213a3, 114a3, and 214a3), the independent interior 333, 433 and exterior 334, 434 surfaces of the port and starboard elevators (in other words, the actuators 333a3, 433a3, 334a3, and 434a3), and the independent lower 543 and upper 545 rudder surfaces (in other words, the actuators 543a3 and 545a3). The third electric circuit 603 is also used to control the actuators 125a3, 225a3 associated respectively with a port air brake 125 and a starboard air brake 225.

Figure 10:
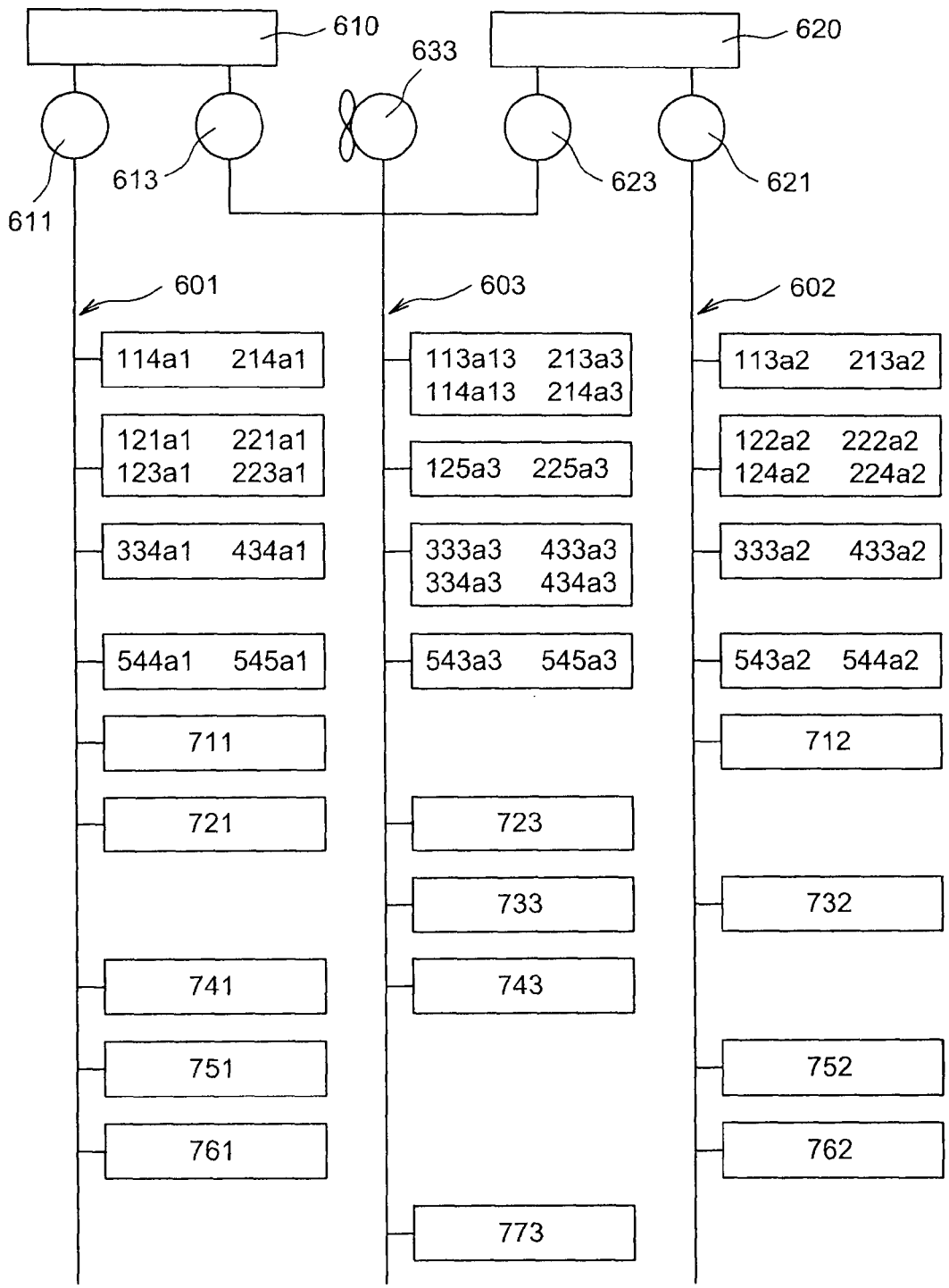
FIG. 10 illustrates the distribution of actuators by electric circuit according to the example of FIG. 9.
Figure 11:
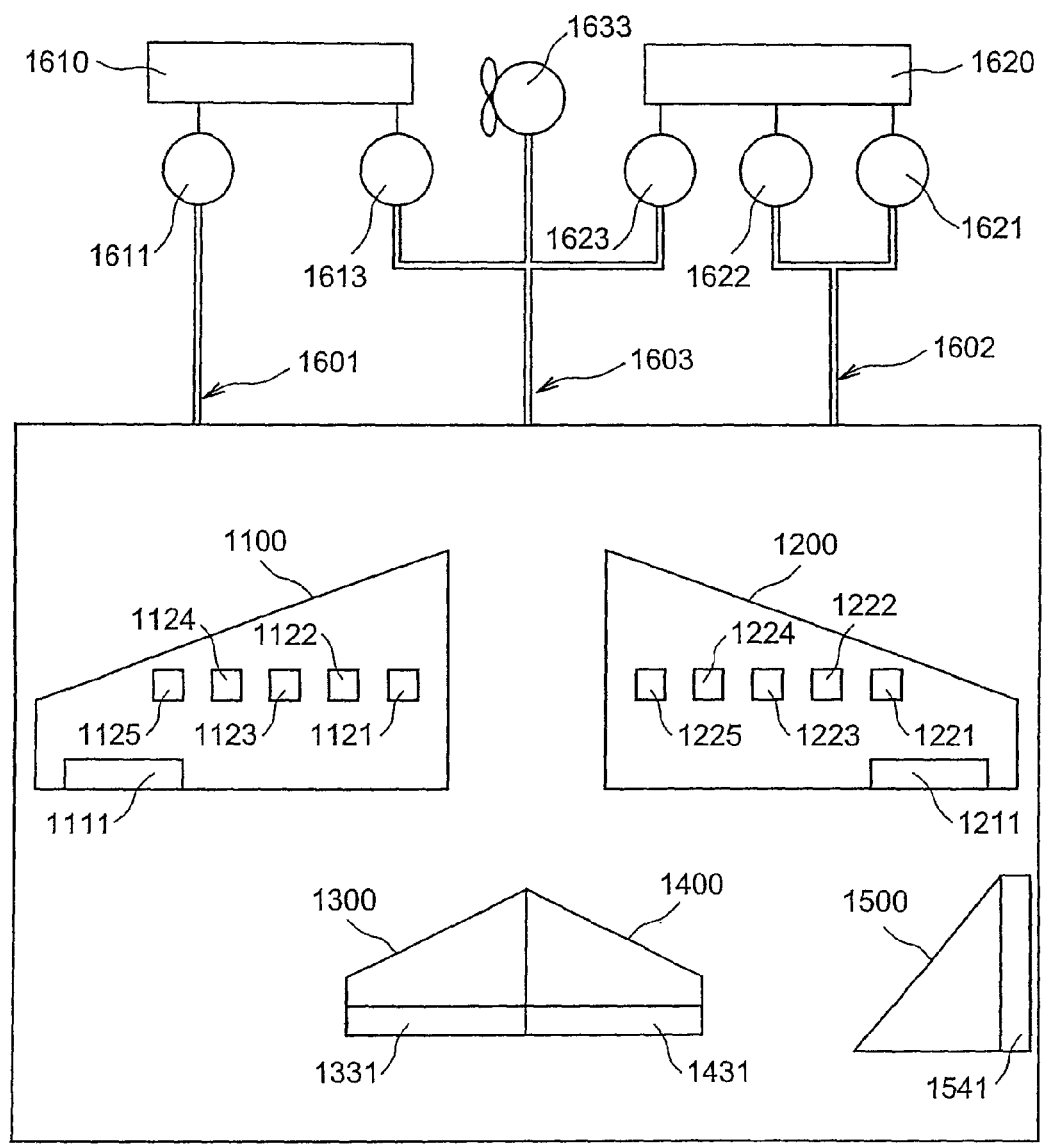
FIG. 11 represents an architecture of a primary flight control system, known from the prior art.

FIG. 10 illustrates the distribution of the actuators by electric circuit according to the example of FIG. 9 and shows that the electric circuits can also supply other controls of the aircraft.

The lines in this figure correspond respectively to the controls of ailerons 113 to 214; air brakes 121 to 225; elevators 333 to 434; rudder 543 to 545; adjustable horizontal plane THSA actuator 711, 712; slats and WTB (Wing Tip Brake) 721, 723; flaps and WTB 732, 733; braking system 741, 743; thrust reversers 751, 752, MLG (Main Landing Gear) 761, 762, NLG (Nose Landing Gear) and the orientation NWS (Nose Wheel Steering) 773.

More specifically, the first electric circuit 601 may be used to control actuators concerning: THSA 711 port side, slats and WTB 721, braking system 741, thrust reversers 751 of the first motor 610 and MLG 761 port side.

The second electric circuit 602 may also be used to control actuators concerning: THSA starboard side 712, flaps and WTB 732, thrust reversers 752 of the second motor 620 and MLG 762 starboard side.

The third electric circuit 603 may also be used to control actuators concerning: slats and WTB 723, flaps and WTB 733, braking system 743, and NLG and NWS 773.

The invention also relates to an aircraft provided with a flight control system according to the invention.

Thus, the control system according to the invention makes it possible to have a more electric airplane (elimination of the hydraulic system) with reliable and less costly EMA actuators, and enables the standardisation of the EMA actuators by choosing sizes of panels or independent surfaces equivalent in required actuator power. This makes it possible to fit a same actuator on all of the rapid surfaces of the airplane. Dividing up the control surfaces makes it possible to reduce the demands on the actuators (in particular, as regards binding, anti-extension and damping), and makes it possible to use actuators of small size for a better integration in the structure of the airplane.

The invention claimed is:

1. A flight control system for an aircraft comprising:
   a plurality of control surfaces;
   a plurality of electromechanical actuators associated with said plurality of control surfaces to control flight functions, including roll, yaw, pitching, and aerodynamic braking of the aircraft, at least one of said plurality of control surfaces being a divided control surface that includes at least two independent control surfaces, and each of said at least two independent control surfaces being controlled by at least two of said electromechanical actuators; and
   control circuitry configured to control the electromechanical actuators controlling said divided control surface,
   wherein the electromechanical actuators which control said divided control surface are configured to each output a same predetermined maximum amount of power,
   wherein said divided control surface is configured such that an efficiency thereof is defined according to a ratio between a predetermined maximum amount of available power for an entirety of said divided control surface when one of the electromechanical actuators of said divided control surface fails and a total weight of the electromechanical actuators of said divided control surface compared to a predetermined total amount of required power for the entirety of said divided control surface,
   wherein the control circuitry is configured to control the electromechanical actuators controlling said divided control surface such that:

upon failure of said one electromechanical actuator of said divided control surface, total power to a first independent control surface not associated with said failed electromechanical actuator remains at a same value, and total power to a second independent control surface associated with said failed electromechanical actuator decreases to a sum of the predetermined maximum amounts of power for the remaining operational electromechanical actuators associated with the second independent control surface; and when all of the electromechanical actuators which control said divided control surface are operational the electromechanical actuators per independent control surface provide a required amount of power for the corresponding independent control surface less than a sum of their predetermined maximum amounts of power.

2. The flight control system according to claim 1, wherein said divided control surface includes two divided control surfaces, each of the two divided control surfaces being divided elevators.

3. The flight control system according to claim 1, wherein said divided control surface is divided rudders.

4. The flight control system according to claim 1, wherein said divided control surface includes two divided control surfaces, each of the two divided control surfaces being divided ailerons.

5. The flight control system according to claim 1, wherein said divided control surface includes one or more of divided elevators, divided rudders, and divided ailerons, each said divided elevator including two independent elevator surfaces, each said divided rudder including two independent rudder surfaces, and each said divided aileron including two independent aileron surfaces.

6. The flight control system according to claim 1, wherein said divided control surface includes one or more of divided elevators, divided rudders, and divided ailerons, each of said divided control surfaces including three independent control surfaces.

7. The flight control system according to claim 1, wherein each of said at least two independent control surfaces is controlled by at least three of said electromechanical actuators.

8. The flight control system according to claim 7, wherein at least two of said at least three electromechanical actuators are configured to function simultaneously.

9. The flight control system according to claim 1, wherein said divided control surface includes a balancing device.

10. The flight control system according to claim 1, wherein each said control surface that is an air brake control surface is controlled by a single one of said electromechanical actuators.

11. The flight control system according to claim 10, wherein said one electromechanical actuator includes a non-reversible transmission, the non-reversibility of said one electromechanical actuator being provided by a device that transforms a rotational movement into a translation movement.

12. The flight control system according to claim 1, wherein each said control surface that is an air brake control surface is one of said at least one control surface that is a divided control surface and includes at least two independent control surfaces thereof controlled by said at least two electromechanical actuators.

13. The flight control system according to claim 1, wherein all of said at least two electromechanical actuators associated with said at least two independent control surfaces are identical.

14. The flight control system according to claim 1, wherein said divided control surface includes a balancing device, said balancing device being associated with an outermost one of said at least two independent control surfaces arranged furthest from a fuselage of the aircraft.

15. The flight control system according to claim 14, wherein said balancing device associated with the outermost one of said at least two independent control surfaces arranged furthest from the fuselage of the aircraft is fitted on said outermost one of said at least two independent control surfaces and not on or to any other of said at least two independent control surfaces.

16. The flight control system according to claim 1, wherein each of said electromechanical actuators is configured to operate in an active-active mode.

17. The flight control system according to claim 1, wherein said at least two electromechanical actuators that control each of said at least two independent control surfaces of said divided control surface are powered by different energy sources.

18. The flight control system according to claim 1, wherein, upon failure of said one electromechanical actuator of said divided control surface, the total power to the second control surface decreases to the sum of the predetermined maximum amounts of power based on an increase in provided power of the remaining operational electromechanical actuators to their same predetermined maximum amount of power.

19. An aircraft provided with a flight control system according to claim 1.

* * * * *